(12) United States Patent
Srinivasan et al.

(10) Patent No.: US 10,712,958 B2
(45) Date of Patent: Jul. 14, 2020

(54) ELASTIC STORAGE VOLUME TYPE SELECTION AND OPTIMIZATION ENGINE FOR PUBLIC CLOUD ENVIRONMENTS

(71) Applicant: Accenture Global Solutions Limited, Dublin (IE)

(72) Inventors: Madhan Kumar Srinivasan, Bangalore (IN); Arun Purushothaman, Chennai (IN); Guruprasad Pv, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 1 day.

(21) Appl. No.: 16/154,174

(22) Filed: Oct. 8, 2018

(65) Prior Publication Data
US 2020/0034057 A1 Jan. 30, 2020

(30) Foreign Application Priority Data
Jul. 24, 2018 (IN) .............................. 201841027749

(51) Int. Cl.
*G06F 3/06* (2006.01)
*G06F 9/50* (2006.01)
*H04L 12/24* (2006.01)

(52) U.S. Cl.
CPC .......... *G06F 3/0631* (2013.01); *G06F 3/0607* (2013.01); *G06F 3/067* (2013.01);
(Continued)

(58) Field of Classification Search
CPC .... G06F 3/0607; G06F 3/0613; G06F 3/0631; G06F 3/0665; G06F 3/067; G06F 9/5077; H04L 41/0806; H04L 41/145; H04L 41/22
(Continued)

(56) References Cited

U.S. PATENT DOCUMENTS 8,266,192 B2 9/2012 Nemoto et al.
8,572,319 B2 10/2013 Kumagai et al.
(Continued)

OTHER PUBLICATIONS

"Amazon EBS Volume Types," Amazon Elastic Compute Cloud, retrieved from Internet on Oct. 4, 2018, pp. 1-17, published online by Amazon at URL https://docs.aws.amazon.com/AWSEC2/latest/UserGuide/EBSVolumeTypes.html.
(Continued)

*Primary Examiner* — Gary J Portka
(74) *Attorney, Agent, or Firm* — Brinks Gilson & Lione

(57) ABSTRACT

A system for elastic volume type selection and optimization is provided. The system may detect that a block storage volume was provisioned by a public cloud computing platform based on a first volume type identifier of a first volume type. The system may determine, based on a normalization model, a baseline operation rate and a baseline throughput rate for the provisioned block storage volume. The system may determine, based on a selected transition mode and historical performance measurements, a simulated operation rate and a simulated throughput rate. The system may communicate, in response to the simulated throughput being greater than the baseline throughput rate or the simulated operation rate being greater than the baseline operation rate, a provisioning instruction to re-provision the provisioned block storage volume on the cloud computing platform.

20 Claims, 9 Drawing Sheets

(52) U.S. Cl.
CPC .......... *G06F 3/0665* (2013.01); *G06F 9/5077* (2013.01); *H04L 41/0806* (2013.01); *H04L 41/145* (2013.01); *H04L 41/22* (2013.01)

(58) Field of Classification Search
USPC .................................. 710/14; 711/154, 170
See application file for complete search history.

(56) References Cited

U.S. PATENT DOCUMENTS

| | | | |
|---|---|---|---|
| 10,250,451 B1* | 4/2019 | Moghe | .................. H04L 41/145 |
| 10,498,824 B2* | 12/2019 | Jain | ..................... H04L 41/0826 |
| 2013/0145092 A1 | 6/2013 | Miwa et al. | |
| 2016/0283139 A1 | 9/2016 | Brooker et al. | |
| 2016/0323374 A1* | 11/2016 | Russinovich | ....... H04L 67/1025 |
| 2018/0150234 A1 | 5/2018 | Karmarkar et al. | |
| 2019/0079848 A1 | 3/2019 | Srinivasan et al. | |
| 2019/0179675 A1 | 6/2019 | Srinivasan et al. | |
| 2019/0205150 A1 | 7/2019 | Srinivasan et al. | |

OTHER PUBLICATIONS

U.S. Appl. No. 16/219,435, filed Dec. 13, 2018.
U.S. Appl. No. 16/285,539, filed Feb. 26, 2019.
U.S. Appl. No. 16/411,064, filed May 13, 2019.
U.S. Appl. No. 16/423,720, filed May 28, 2019.
Extended European Search Report in Europe Application No. 19161579.8, dated Aug. 8, 2019, 13 pages.
Anonymous, "Amazon EBS Volume Types—Amazon Elastic Compute Cloud," May 21, 2018, XP055610641, Retrieved from the Internet, on Aug. 2, 2019, from URL: <https://web.archive.org/web/20180521021/https://docs.aws.amazon.com/AWSEC2/latest/UserGuide/EBSVolumeTypes.html>, 19 pages.
Examination report No. 1 for Australian patent application No. 2019201625, dated Jan. 7, 2020, 6 pages.
Chambliss, D. et al. "Performance virtualization for a large-scale storage systems", Proceedings of the $22^{nd}$ International symposium on Reliable distributed Systems, 2003.

* cited by examiner

FIG. 8

EBS Summary

Resource ID: vol-HASHLcjiFyhdskIEwknmdoeBmsASDKFemwerij8Jk

Performance Summary
Volume: +476 GB
iOPS: +1900 iOPS
Throughput: +7 MB/s

Environment: PROD
Account ID: 8123456277
Application ID: 542520

| Metric | Value |
|---|---|
| Provisioned IOPS | 6,500 IOPS |
| Provisioned Volume | 1024 GB |
| Used Storage | 353 GB |
| Max until IOPS | 4,947 IOPS |
| Max until Throughput | 79 MB/s |
| P99 IOPS | 4,199 IOPS |
| P99 Throughput | 67 MB/s |
| Blocksize | 0.0160 KiB |

| Recommendation | Value |
|---|---|
| Recommended IOPS | 4600 IOPS |
| Recommended Volume | 1500 GB |
| Recommended Throughput | 74 MB/s |

Home Page | EBS Summary | EBS Analysis

ELASTIC STORAGE VOLUME TYPE SELECTION AND OPTIMIZATION ENGINE FOR PUBLIC CLOUD ENVIRONMENTS

CROSS REFERENCE TO RELATED APPLICATIONS

This application claims the benefit of Indian Provisional Application No. 201841027749 filed Jul. 24, 2018, the entirety of which is hereby incorporated by reference.

TECHNICAL FIELD

This disclosure relates to cloud storage volumes and, in particular, to block storage volume optimization based on elastic block storage volume types.

BACKGROUND

Cloud storage optimization may involve selecting, configuring, and maintaining cloud infrastructure and computing resources. The optimal selection, allocation, and configuration of cloud infrastructure enables maximum performance with minimal under-utilization. In many cloud environments, cloud resources are either over-provisioned or under-provisioned, resulting in inefficient utilization of limited computing resources. Alternatively, or in addition, the workloads and requirements for provisioned infrastructure may vary over time resulting a provisioned cloud infrastructure configuration that is obsolete or unable to scale in order to satisfy rapidly growing storage demands.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 8 illustrates a second example of a graphical user interface; and

FIG. 9 illustrates a third example of a graphical user interface.

DETAILED DESCRIPTION

Figure 1:
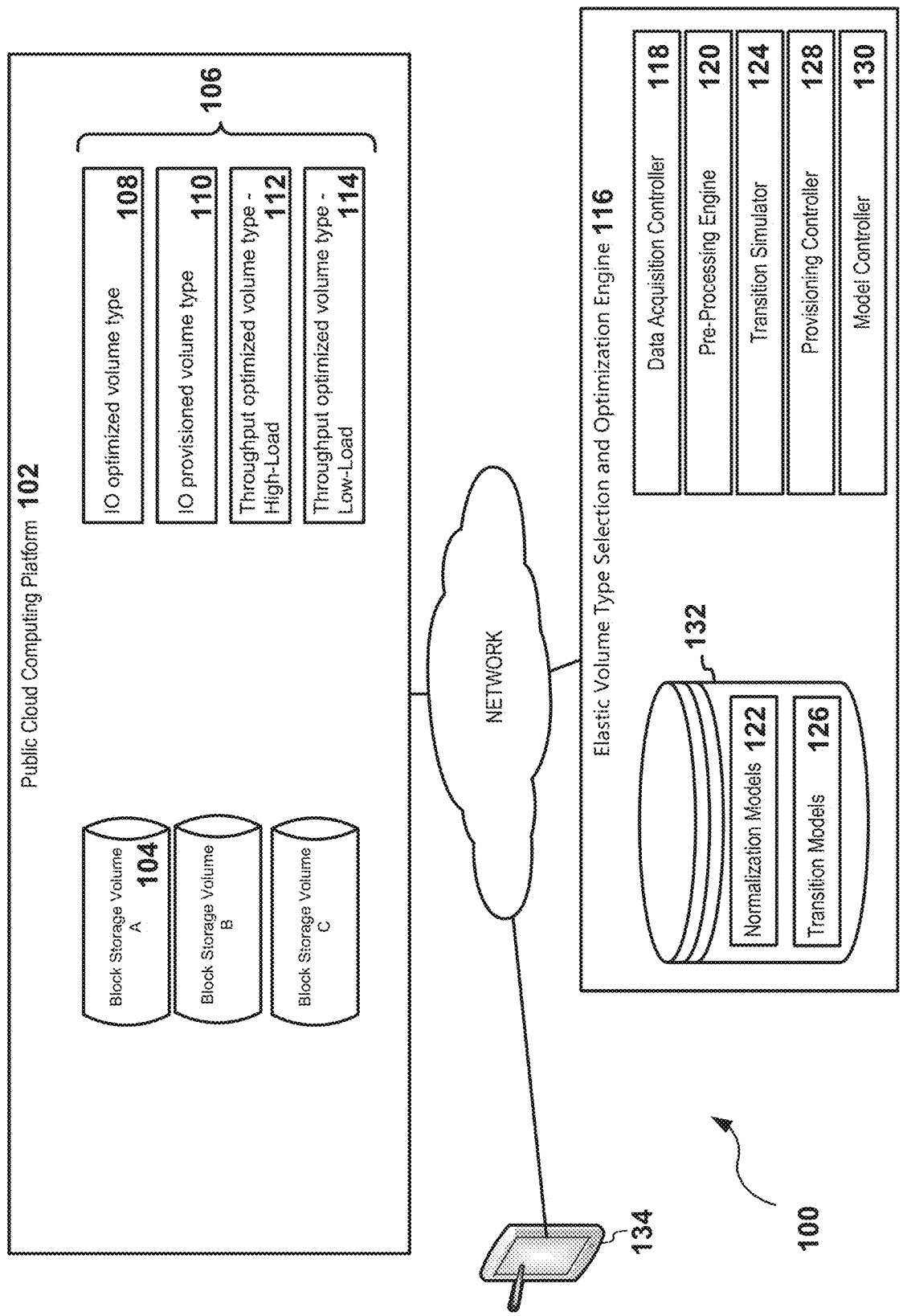
FIG. 1 illustrates an example of a system for an elastic volume type selection and optimization engine.

Cloud storage optimization may involve selecting, configuring, and maintaining cloud infrastructure. The optimal selection, allocation, and configuration of cloud infrastructure enables maximum performance at the lowest possible cost in a public cloud. In many cloud environments, cloud resources are either over-provisioned or under-provisioned, resulting in inefficient utilization of limited computing resources. Alternatively, or in addition, the workloads and requirements for provisioned infrastructure may vary over time. As data storage demands continue to increase, scalability has become a critical concern for businesses.

System and methods for elastic storage volume type selection and optimization are provided. By way of introductory example, an elastic volume type selection and optimization engine (eVSO engine) may provide recommendations that are objectively optimized based on multi-characteristics of both elastic storage dynamics and public cloud constraints. These multi-characteristics may include, for example, storage disk type, disk size, IOPS, throughput, I/O block size, availability zone, and/or dynamic baseline metrics. Alternatively or in addition, the eVSO engine may accurately provisioning resources based on real-time demands and may minimize performance bottlenecks, minimize cost, and/or reduce over-provisioning.

In an example embodiment, the eVSO engine may store, in a repository, a plurality of transition models associated with respective volume type identifiers of volume types that govern dynamic resource allocation on a public cloud computing platform for providing access to block storage volumes. The eVSO engine may detect that a block storage volume was provisioned by a cloud computing platform based on a first volume type identifier of a first volume type. The first volume type may cause the cloud computing platform to control a runtime operation rate permitted for accessing at least one of the block storage volumes. The eVSO engine may determine, based on a normalization model, a baseline operation rate and a baseline throughput rate for the block storage volume. The eVSO engine may select a transition model that is associated with a second volume type identifier of a second volume type, wherein the second volume type causes the cloud computing platform to control a runtime throughput rate permitted for accessing the at least one of the block storage volumes. The eVSO engine may determine, based on the transition model and historical performance measurements for the block storage volume, a simulated operation rate and a simulated throughput rate. The eVSO engine may communicate, in response to at least one of the simulated throughput being greater than the baseline throughput rate or the simulated operation rate being greater than the baseline operation rate, a provisioning instruction to re-provision the block storage volume on the cloud computing platform, the provision instruction comprising provisioning settings, the provisioning settings comprising the second volume type identifier.

The systems and method described herein are applicable to cloud computing platforms that control block storage volume performance based on volume type. For example, block storage volumes provisioned under Amazon Web Services (AWS) public cloud storage services have different classes of storage designed for different business use cases. Amazon Elastic Block Store (EBS) is one of the storage classes. Some EBS storage volume types, such as io1 (a provisioned IOPS SSD), facilitate the users by providing the option to provision the storage and input/output operations per second (IOPS) separately. Other EBS storage volume types, such as gp2 (general purpose solid-state drives (SSD), st1 (throughput optimized hard disk drives (HDD) and sc1 (cold HDD), default IOPS provisioning based on the size of the provisioned volume, and as described on Amazon's websites, for example at https://docs.aws.amazon.com/AWSEC2/latest/UserGuide/EBSVolumeTypes.html.

One example of a technical advancement achieved by the systems and methods described herein may be that a block storage volume may be re-provisioned with a volume type, and other configuration settings, which then satisfy the storage demands placed on the block storage volume, thereby assuring more efficient storage allocation, faster data retrieval rates, lower latency and more efficient use of CPU resources controlling the data IO. Normalization models may generate and/or normalize baseline performance metrics for comparison between various volume types. Transition models may apply complex rules and logic that are tailored for target volume types to determine simulated performance metrics. The normalization models and/or the transition models may provide transition recommendations in a manner that is more accurate and timelier than a human operator can provide. The improved volume types may be selected based on multiple metrics such as IOPS, throughput, block-size, provisioned volume, pricing along with the underlying baseline performance metrics for each storage type.

Another technical advancement of the systems and methods described herein may be that an instruction to re-provision the block storage volume may be generated based on the performance gains or cost saving by re-provisioning block storage volumes. The provisioning instruction may be communicated to a display interface and/or directly to a cloud computing platform. In some examples, the provisioning instruction may be communicated to an operator via an alert to notify an operator of a time-sensitive need to re-provision a block storage volume. The display interface may enable an operator to visualize the performance gains or cost savings in a manner that is visually intuitive to the user. The provisioning instruction may be automatically generated to avoid user input error in determining the correct parameters used by the cloud computing platform to provision block storage volumes. Additional benefits, efficiencies, and improvements over existing market solutions are made evident in the systems and methods described below.

FIG. 1 illustrates an example of a system 100 for elastic volume type selection and optimization. The system 100 may include a public cloud computing platform 102. The public cloud computing platform 102 may provision and/or provide access to a block storage volume 104, or block storage volumes. The public cloud computing platform 102 may dynamically allocate, computing resources, such as processor(s), storage, memory, network resource(s), and/or circuitry to providing access to the block storage volume 104. As described in various non-limiting examples throughout this disclosure, the cloud computing platform 102 may include Amazon web services (AWS) and/or Amazon Elastic Block Storage (EBS). In other examples, the public cloud computing platform 102 may include other cloud-based services and/or sub-services.

In some examples, the cloud computing platform 102 may control how computing resources are allocated for providing access to the block storage volume 104 volume based on volume types 106. For example, the block storage volume 104 may be assigned or associated with a particular volume type. In some examples, the association may include a mapping between an identifier of the block storage volume 104 and an identifier corresponding to the volume type, or any other manner of association. In some examples, the volume type may be associated with an allocation model. The allocation model may define how runtime performance should be throttled based on various criteria, parameters, thresholds, and logic included in the allocation model. The cloud computing platform 102 may throttle the runtime performance according to the allocation model for available volume types.

The allocation models corresponding to each of the volume types 106 may define how to throttle performance based on one or more baseline metric for the block storage volume 104. A baseline performance metric may refer to either a provisioned setting for the block storage volume 104 or a metric derived from a provisioned setting. In some examples, the baseline performance metric may include an input/output (IO) rate, such as input/output operations per second (IOPS). In other examples, the baseline performance metric may include a throughput rate, such as MB/sec, and/or some other metric that is indicative of the latency, throughput, or any other performance measure. The allocation model may vary the baseline performance metric based on provisioned settings of the block storage volume 104 and the runtime conditions of the block storage volume 104. Accordingly, in implementations where multiple block storage volumes are provisioned, the cloud computing platform may throttle the performance of each block storage volume differently, depending on the provision settings of the block storage volume 104 and/or changes in runtime demand.

As previously discussed, each of the volume types 106 may be associated with a corresponding allocation model. In some examples, the volume types 106 may include an IO optimized volume type 108. The IO optimized volume type 108 may be associated with an allocation model designed to provide and maintain low latencies for IO operations. For example, the baseline metric for the allocation model of the IO optimized volume type 108 may include a baseline IO rate. The IO optimized volume type 108 may throttle a runtime IO rate of the block storage volume 104 based on the baseline IO rate. The allocation model associated with the IO optimized volume type 108 may calculate the baseline IO rate based on a provisioned volume size for the block storage volume 104. In other examples, the baseline IO rate metric may be derived from a provisioned setting that is provided to the cloud computing platform 102 when the block storage volume 104 is provisioned on the cloud computing platform 102.

In some examples, the allocation model for an IO optimized volume type 108 may provide a burst mode. A burst mode may cause the cloud computing platform 102 to permit a runtime IO rate higher than the baseline IO rate by drawing from a burst credit balance. For example, when the runtime IO rate of the block storage volume 104 reaches the baseline IO rate, the cloud computing platform 102 may draw from the burst credit balance to increase a maximum permitted IO rate (MAX-IO). When the burst credit balance is depleted, the cloud computing platform 102 may cause the runtime performance to decrease to the baseline performance metric. In some examples, burst mode may only be available for storage capacities less than a predefined threshold. By way of example, the IO optimized volume type 108 may include a GP2 volume type, or similar volume type, available by Amazon's Elastic Block Storage (EBS) scheme.

The volume types 106 may further include an IO provisioned volume type 110. The IO provisioned volume type 110 may include an allocation model that causes the cloud computing platform 102 to meet IO intensive demands. The baseline metric for the IO provisioned volume type 110 may include a baseline throughput rate. The IO provisioned volume type 110 may cause the cloud comping platform 102 to limit the maximum throughput available for the block storage volume 104 based on the baseline throughput rate. The baseline throughput rate may be determined by a provisioned IO rate specified in a provisioning setting for the block storage volume 104. In some examples, the baseline throughput rate may scale linearly with the provisioned IO rate. By way of example, the IO provisioned volume type 110 may include the io1 volume type available by Amazon's EBS scheme.

The volume types 106 may further include the throughput optimized types 112, 114. The throughput optimized volume types 112, 114 may include respective allocation models that cause the cloud computing platform 102 to meet the demands of sequential workloads for the block storage volume 104. Analogous to the IO optimized volume type, the throughput optimized volume types 112, 114 may vary the maximum throughput available for the block storage volume 104 based on a provisioned volume size of the block storage volume 104. For example, the baseline throughput rate may scale linearly with the provisioned volume capacity. In some examples, the throughput optimized volume type dynamically permit runtime throughput that is greater than the baseline throughput via a burst mode. For example, when the runtime throughput of the block storage volume 104 reaches the baseline throughput for the provisioned volume, the cloud computing platform 102 may draw from the burst credit balance to increase maximum throughput based on a burst throughput. When the burst credit balance is depleted, the maximum throughput may be decreased to the baseline value based on the volume capacity provisioned for the block storage volume 104.

The throughput optimized volume types 112, 114 may be customized for high loads and/or low-loads. For example, the throughput optimized volume types 112, 114 may include a first throughput optimized volume type 112 and a second throughput optimized volume type 114. The first throughput optimized volume type 112 may specify a relatively larger burst throughput and/or base throughput for workloads that demand frequent access. The second throughput optimized volume type 114 may to provide relatively lower burst throughputs and/or base throughputs for workloads that require infrequent access. By way of example, the throughput optimized volume types 112, 114 may include an st1 volume type or an sc1 volume type, available by Amazon's EBS scheme.

The cloud computing platform 102 illustrated in FIG. 1, and described herein, is provided by way of example. In general, the cloud computing platform 102 may include any system that throttles performance for reading, writing, and/or otherwise communicating with one or more block storage volumes. For example, the cloud computing platform 102 may include any system that controls, based on specific volume types, a latency, a throughput, or any other performance measure for reading, writing, and/or otherwise communicating with one or more block storage volumes. The volume types may cause the cloud computing platform 102 to throttle performance of the block storage volume or resources utilized to access the block storage volume. The block storage volume types illustrated in FIG. 1, and the Amazon EBS volume types referred to herein, are provided by way of example. Additional or alternative elastic volume types are may be possible, depending on the implementation and/or the vendor of the cloud computing platform 102.

The system 100 may include a eVSO engine 116. The eVSO engine 116 may include a data acquisition controller 118. The data acquisition controller 118 may receive raw performance data related to one or more block storage volume. The raw performance data may include historical performance measurements that are indicative of performance indicators for the block storage volume 104 and/or the computing resources of the cloud computing platform 102. In some examples, the historical performance measurements may include measurements of a runtime operation rate, such as IOPS, at a particular time or over a time interval. Alternatively or in addition, the historical performances measurements may include measurements of a runtime throughput rate, such as MB/S, at a particular time or over a time interval.

The data acquisition controller 118 may monitor the cloud computing platform and/or the block storage volume 104 to receive the raw performance data. Alternatively or in addition, the data acquisition controller 118 may receive the raw performance data from a file, a database, or some other source. The data acquisition controller 118 may store the raw data in a storage system, such as a database or a data lake. The raw performance data may be organized and/or sorted based on volume identifiers, account identifiers, and/or any other information that groups the volume identifiers. Runtime performance metrics may be calculated or determined for each of the block storage volumes provisioned on the cloud computing platform 102 and/or associated with a particular account. In some examples, the data acquisition controller 118 may be configured with particular volume identifiers. For example, the data acquisition control may receive the volume identifiers. The data acquisition controller may monitor, sort, and/or prepare the raw performance data based on the specified volume identifiers, while ignoring raw performance data related to other volume identifiers. In some examples, the data acquisition controller 118 may perform data minimization and/or create of new measurement variables. Alternatively or in addition, the raw performance data may be treated for missing values and only resources that have both billing and utilization records may be considered for further analysis.

The eVSO engine 116 may further in include a pre-processing engine 120. The pre-processing engine 120 may pre-process the raw performance data to determine key metrics. For example, the pre-processing engine 120 may perform statistical and/or machine learning analysis on the raw performance data. In some examples, the key metrics may include a high-load metric and a percentile-based performance metric.

The high-load metric may refer to an approximation of the runtime performance when the block storage volume 104 is under high demand. For example, the high-load metric may include a maximum runtime performance metric over a specified time interval. In some examples, the high-load performance metric may include a maximum IO rate identified over a specified time interval. Alternatively or in addition, the high-load performance metric may include a maximum throughput rate over a specified time interval.

Percentile-based performance metrics may provide detailed insights into the distribution of a utilization curve as opposed to "averages". Percentiles are also desirable for tuning and giving optimizations a specific goal. For example, the 99th percentile (P99) provides a measure to understand if the distribution is left-skewed or otherwise. When the P99 metric is coupled with the high-load metric or "maximum" metric, the recommendations are more confident and statistically sound. The eVSO engine 116 looks at the utilization ratio, such as "max"/P99 ratio ($\alpha$), to not only make precise volume type recommendations but also decide which would be measure based on which additional buffer would be provisioned to ensure the performance is not affected. As an example, suppose IOPS is the performance criteria for a io1 volume and the max IOPS in the past 90 days was 8000 and the P99 was 4000, $\alpha=2$. This may suggest that the max value is a rare event or otherwise an outlier. The performance buffer would be provisioned on the P99 value. Assuming a buffer of 10%, the new EBS Volume (say gp2) would be provisioned for 4,400 IOPS (10% on top of 4000 IOPS).

The percentile based performance metric may be a metric that is less than a maximum performance metric. For example, the percentile based performance metric may include a P90 metric, a P95 metric, a P99 metric, or some other percentile-based performance measurement Depending on the implementation and the type of performance metric being measured, various percentiles may be desirable. The eVSO engine may allow a user to choose the statistical percentile measurement type and/or the performance measurement type at both resource id level and at a global level (depending on environment, application and/or account). For example, for very active block storage volume (like banking transactional databases), we may have to use a performance-based percentile measurement which is different from another block storage volume having a non-transactional databases.

In some examples, the pre-processing engine 120 may normalize the baseline metrics corresponding to each volume type. A normalized baseline metric for a volume type may refer an effective baseline metric that may be compared between the volume types 106. For example, the pre-processing engine 120 may receive provisioning setting(s), volume type identifier(s), runtime performance metric(s), high-load performance metrics(s), percentile-based performance metric(s), and/or parameters that define an allocation model for particular volume type. The information received by the pre-processing engine 120 may be applied to normalization model(s) 124 associated with one or more volume type identifier. The normalization models 122 may include parameters, logic, instructions, and other information used to determine and/or normalize a baseline metric used by one or more allocation model for the volume type. The normalization models 122 may each be calibrated based on the specific thresholds and parameters for the allocation model of a particular volume type.

The normalization models 122 may be associated with and/or organized by volume type identifiers. Each normalization model may be associated with a volume type identifier. Thus, the normalization model used to determine the baseline metrics for a block stage volume may be identified based on the volume type identifier associated with the block storage volume 104.

In some examples, the normalization models 122 may account for the burst mode of corresponding to a volume type. By way of example, in some cloud computing systems, a volume type may have an allocation model that applies a burst mode, as previously discussed. The pre-processing engine 120 may use adjust the baseline metric based on parameters that define the burst mode, such as burst credit balance, time-to-fill credit balance, and/or maximum burst duration. Alternatively or in addition, the pre-processing engine 120 may apply the high-load metric and/or the percentile-based metric, a burst credit balance, a time-to-fill the credit balance, a maximum burst duration, and/or other variables to a particular normalization model configured to receive these values. In general, the baseline metrics calculated by the pre-processing engine 120 and/or the normalization models 122 may account for the specific provisioned settings and the historical performance of the block storage volume 104.

Table 1 provides an example of normalization models 122 that may be applied to determine normalized baseline metrics for Amazon EBS volume types.

TABLE 1

Normalization Models for Amazon Elastic Block Store (EBS)

| EBS Volume Type | Baseline Normalization Model |
|---|---|
| General Purpose SSD (gp2) | IOPS credits ($\emptyset$) = 5.4 Million<br>Time to fill empty credit balance ($\bar{k}$) = $\emptyset$/Baseline IOPS (gp2)<br>Maximum burst duration @ 3,000 IOPS (seconds) (o') = $\emptyset$/(3000 − ε)<br>Normalized Baseline IOPS ($\Sigma$(gp2)) =<br>If ($\beta$(gp2)) < 3000 then<br>((($\bar{k}/(\bar{k} + o'))*3000) +<br>((1 − ($\bar{k}/(\bar{k} + o')))*<br>$\beta$(gp2)) else $\beta$(gp2))<br>Resulting Normalized Baseline Throughput (gp2) also known as<br>$\delta$(gp2) = $\Sigma$(gp2) * I/O Block-size for gp2 volume<br>Where $\beta$(gp2) = P99 IOPS for the given gp2 Volume |
| Throughput Optimized HDD (st1) | Normalized Baseline Throughput ($\delta$(st1)) = If ($\beta$(st1) < 500 then (2*Provisioned Volume/ ((Provisioned Volume/$\beta$(st1)) + (Provisioned Volume/250))) else $\beta$ (st1))<br>Resulting Normalized Baseline IOPS ($\Sigma$(st1)) = $\delta$(st1)/(I/O Block-size for gp2 volume)<br>Where $\beta$(st1) = Baseline throughput for st1 volume |
| Cold HDD (sc2) | Normalized Baseline Throughput ($\delta$(sc1)) = If ($\beta$(sc1) < 250 then (2*Provisioned Volume/ ((Provisioned Volume/$\beta$(sc1)) + (Provisioned Volume/250))) else $\beta$'(sc1))<br>Resulting Normalized Baseline IOPS ($\Sigma$(sc1)) = $\delta$(sc1)/ (I/O Block-size for gp2 volume)<br>Where $\beta$(sc1) = Baseline throughput for sc1 volume |

The eVSO engine 116 may further include a transition simulator 124. The transition simulator 124 may forecast that one or more volume types, other than the volume type currently in use for the block storage volume 104, will result in a more optimal utilization of computer resources on the cloud computing platform 102. Alternatively or in addition, the transition simulator 124 may forecast that one or more volume may provide higher performance on the cloud computing platform 102. For example, the transition simulator 124 may determine that the block storage volume 104 provisioned with a first volume type may receive less restrictions on performance if the block storage volume 104 were re-provisioned one or more second volume types.

The eVSO engine 116 may include a plurality of transition models 126 that respectively correspond to the volume types 106. A transition model may include rules, logic, and/or instructions that determine one or more simulated performance metric for a corresponding volume type. A simulated performance metric may include a planned and/or forecasted prediction of a runtime performance metric based on parameters derived from the raw performance data and/or the allocation model for a volume type. In some examples, the simulated performance metric may include a simulated throughput rate or a simulated IO rate. Alternatively or in addition, the transition model include logic that compares a high load performance metrics and/or a percentile-based performance metric with parameters or rules derived from the allocation model for a volume type to determine the simulation metric. Alternatively or in addition, the transition model may consider various parameters such location (e.g.

AWS Availability Zones), IOPS count, Throughput, Block-size, Provisioned Volume-size, Actual Volume-size, Volume Type for all volumes.

In some examples, the transition models 126 may determine a performance metric based on a utilization ratio of a high-load performance metric and a percentile-based performance metric. The utilization ratio may be indicative of how the utilization distribution is spread. If the ratio is less than 1.5, this would suggest that distribution is left-skewed (in other words, the percentile-based metric is closer to the high-load metric). In such a case, the transition simulator 124 would determine the simulated performance metric based on the high-load metric. Similarly, if the value is greater than or equal to 1.5, the simulated performance metric would be based on percentile-based performance metric.

In some examples, the transition models 126 may further include flagging logic that determines whether a particular volume type should be flagged for transition. For example, the transition models 126 may compare a baseline performance metric(s) with a simulated performance metric(s) to determine whether to flag the volume type associated with the transition odel. In some examples, the baseline performance metric(s) may be previously determined by the pre-processing engine 120 according to at least one of the normalization models 122. In examples where the baseline performance metric includes a baseline IO rate and/or a baseline throughput rate, the transition model may flag a volume type identifier in response to the simulated IO rate being greater than the baseline IO rate and/or the simulated throughput rate being greater than the baseline throughput rate.

In some examples, one or more of the transition models 126 may include a selection criteria. The selection criteria may specify whether a particular transition model is applicable to a block storage volume with a provisioned volume type. The selection criteria include, for example, at least one provisioned volume type identifier and at least one target volume type identifier. The provision volume type identifier may be indicative of the volume type currently provisioned for a particular block storage volume. The target volume type identifier may be indicative at least one of the volume type identifiers in which the transition model is configured for. The transition model may determine, for example, simulated performance metrics based on the target volume type. In some examples, the selection criteria may include logic and/or an instruction that determines, based on a specified volume type identifier, whether the transition model should be selected. The cloud storage volume may execute the transition criteria when selecting a subset of the transition models 126 for analysis of block storage volumes.

Table 2 lists examples of the transition models 126 that may be applied to determine simulated baseline metrics and flag Amazon EBS volume types.

TABLE 2

Normalization Models for Amazon Elastic Block Store (EBS)

| | io1 to gp2 transition |
|---|---|
| Selection Criteria Pseudo-Logic | Provisioned Type: io1<br>Target Type: gp2<br>Planned IOPS (gp2) = If (max_IOPS < 9090 then (If ($\alpha$ <= 1.5 then (If $\beta$ < 10000 then $\beta$ else 10000)) else (If $\gamma$ < 10000 then $\gamma$ else 10000)) else "consider updating IOPS provisioning settings or other re-provisioning with other volume types")<br>Where,<br>$\alpha$ = Max IOPS/P99 IOPS<br>$\beta$ = P99 IOPS rounded-up to the nearest 1000 multiple after provisioning 10% buffer on P99 IOPS value<br>$\gamma$ = Max IOPS rounded-up to the nearest 1000 multiple after provisioning 10% buffer on Max IOPS value<br>Resulting Planned Throughput (gp2) = Planned IOPS * I/O Block-size for gp2 volume<br>Planned Volume for gp2 (GB) = If ($\pi$ >= 1.5 then (If $\Omega$ < 16000 then $\Omega$ else 16000) else "Current provisioned Volume")<br>Where,<br>$\pi$ = $\Omega$/(Actual Volume Used (GB))<br>$\Omega$ = Planned IOPS (gp2)/$\varepsilon$ (gp2)<br>$\varepsilon$ (gp2) = (IOPS/Volume in GB) standard ratio for the gp2 Volume Class = 3<br>Transition Flag = If [((Planned IOPS >= Provisioned IOPS) AND (Planned Throughput >= Provisioned Throughput)) then "Recommend Transition" else "Do not transition"] |
| | Any transition to st1 |
| Selection Criteria Pseudo-Logic | Provisioned Type: any<br>Target Type: st1<br>Planned Throughput (st1) = If ($\alpha$ <= 1.5 then (If $\beta$ < 10000 then $\beta$ else 500) else (If $\gamma$ < 10000 then $\gamma$ else 500))<br>Where,<br>$\alpha$ = Max Throughput/P99 Throughput<br>$\beta$ = P99 Throughput rounded-up to the nearest $10^{th}$ multiple after provisioning 10% buffer on P99 Throughput value<br>$\gamma$ = Max Throughput rounded-up to the nearest $10^{th}$ multiple after provisioning 10% buffer on Max Throughput value<br>Resulting Planned IOPS (st1) = Planned Throughput/Block-size for st1 volume<br>Planned Volume for st1 (GB) = If ($\pi$ >= 1.5 then (If $\Omega$ < 16000 then $\Omega$ else 16000) else "Current provisioned Volume")<br>Where,<br>$\pi$ = $\Omega$/(Actual Volume Used (GB))<br>$\Omega$ = Planned Throughput (st1)/$\varepsilon$ (st1)<br>$\varepsilon$ (st1) = (Throughput/Volume in GB) standard ratio for the st1 Volume Class = .04<br>Transition Flag = If [((Planned IOPS >= Provisioned IOPS) AND (Planned Throughput >= Provisioned Throughput)) then "Recommend Transition" else "Do not transition"] |
| | Any transition to sc1 |
| Selection Criteria Pseudo-Logic | Provisioned Type: any<br>Target Type: sc1<br>Planned Throughput (sc1) = If ($\alpha$ <= 1.5 then (If $\beta$ < 10000 then $\beta$ else 192) else (If $\gamma$ < 10000 then $\gamma$ else 192))<br>Where,<br>$\alpha$ = Max Throughput/P99 Throughput<br>$\beta$ = P99 Throughput rounded-up to the nearest $10^{th}$ multiple after provisioning 10% buffer on P99 Throughput value<br>$\gamma$ = Max Throughput rounded-up to the nearest $10^{th}$ multiple after provisioning 10% buffer on Max Throughput value<br>Resulting Planned IOPS (sc1) = Planned Throughput/Block-size for sc1 volume<br>Planned Volume for sc1 (GB) = If ($\pi$ >= 1.5 then (If $\Omega$ < 16000 then $\Omega$ else 16000) else "Current provisioned Volume")<br>Where,<br>$\pi$ = $\Omega$/(Actual Volume Used (GB))<br>$\Omega$ = Planned Throughput (sc1)/$\varepsilon$ (sc1)<br>$\varepsilon$ (sc1) = (Throughput/Volume in GB) standard ratio for the st1 Volume Class = .012<br>Transition Flag = If [((Planned IOPS >= |

TABLE 2-continued

Normalization Models for Amazon Elastic Block Store (EBS)

Provisioned IOPS) AND (Planned Throughput >= Provisioned Throughput)) then "Recommend Transition" else "Do not transition"]

The eVSO engine 116 may further include a provisioning controller 128. The provisioning controller 128 may generate one or more provisioning instructions. A provisioning instruction may include an instruction to re-provision the block storage volume 104 with at least one of the volume types 106. For example, the transition simulator 124 may flag one or more volume types. The provisioning controller 128 may generate a corresponding provisioning instruction for each flagged volume type. The provisioning instruction may include provisioning settings. The provisioning settings may include the volume type identifier, the volume capacity, the simulated throughput rate, the simulated IO rate, and/or any other information used to provision and/or re-provision the block storage volume 104. In some examples, the provisioning settings may be carried over from the previous provisioning setting. For example, the provisioning settings may include the same volume name, capacity, or other provisioning settings used for the block storage volume 104.

In some examples, the provisioning instruction may include a command that causes the cloud computing platform 102 to re-provision the block storage volume 104 and/or provision a new block storage volume. Alternatively or in addition, the provisioning instruction may include a recommendation that may be displayed on a user interface. For example, the provisioning controller 128 may communicate multiple provisioning instructions to a remote device 132 for display on a user interface. The provisioning controller 128 may receive a selection input indicative of one of the provisioning instructions. The provisioning controller 128 may communicate, in response to receipt of the selection input, a provisioning command to the cloud computing platform 102 that causes the cloud computing platform 102 to provision or re-provision the block storage volume in accordance with the selected provisioning instruction.

The eVSO engine 116 may further include a model controller 130. The model controller 130 may manage the normalization models 122 and/or the transition models 126. For example, the numerical thresholds and logic used to define the normalization models 122 and/or the transition models 126 may change over time as the allocation models for each of the volume types 106 are adjusted by the cloud computing platform 102. The model controller 130 may receive updated parameters and update, replace, add, or delete normalization models 122 and/or transition models 126. Alternatively or in addition, the model controller 130 may receive an updated transition model and/or an updated normalization model. In an example, the parameters defined in Table 1 and Table 2 may change over time as Amazon changes the EBS scheme. The model controller 130 may receive updated parameters for the normalization models 122 and/or the transition models 126. For example, the model controller may receive a parameter that updates IOPS credits (Ø) to 6.0 Million. The model controller 130 may update normalization model associated with the GP2 volume type in response to receiving the updated IOPS credits.

In some examples, the model controller 130 may receive parameters that are may adjust how a transition model applies the high-load metrics, percentile-based metrics and/or the utilization ratio. For example, the model controller 130 may determine a utilization ratio (a), which is a ratio of a high-load performance metric, such as MAX IOPS, to a percentile-based performance metric, such as P99 IOPS. The transition model may apply a buffer to the high-load performance metric, such as 10%. The buffer may be tunable based on input to the model controller. For example, the model controller may receive input that is used to adjust a buffer for one or more of the transition models 126. The input may be received from a user interface that is configured to receive parameters to tune/adjust the transition models 126 and/or the normalization models 122.

The eVSO engine 116 may store the normalization models 122 and/or the transition models 126 in a model repository 132. The model repository 132 may include a database and/or storage configured to store the normalization models 122 and/or the transition models 126. Alternatively or in addition, the normalization models 122 and/or the transition models 126 may be associated with corresponding volume type identifiers. Accordingly, a particular normalization model and/or a particular transition model may be identified based on a specified volume type identifier.

In some examples, the system may include a remote terminal 134. eVSO engine 116 may communicate with the remote terminal 134. The remote terminal 134 may display a graphical user interface generated and/or communicated by the eVSO engine 116. In some examples, the graphical user interface may display the normalizations models 122, the transition models 126. Alternatively or in addition, the graphical user interface may display the available volume types and/or the volume types flagged by the transition simulator 124. The graphical user interface may view display an IOPS/Throughput utilization pattern for every individual volume with dynamic date filters.

In some examples, the graphical user interface may display a detailed list of all the volumes recommended transitions with cost and/or performance saving classifications. The performance saving classifications may include, for example, "high", "medium", and/or "low" categories. The graphical user interface may display one or more provisioning instruction generated by the provisioning controller 128. The remote terminal 134 may communicate selection input indicative of selected volume types and/or provisioning instructions. Alternatively or in addition, the graphical user interface may include a master approve feature that allows a user to perform one or multiple approvals in a simplified way.

In some examples, the graphical user interface may receive parameters related to a transition model and/or a normalization model. The graphical user interface and/or the remote terminal 134 may communicate the parameters to the eVSO engine 116. The model controller may update the normalization models 122 and/or the transition models 126 in response to receipt of the parameters. For example, the graphical user interface may accept utilization thresholds, buffer values, and other values. In other words, the user interface may allow customized tuning of the normalization models 122 and/or the transition models 127. The thresholds can be set at global or individual volume level. Additional examples of the graphical user interface are discussed in reference to FIGS. 7-9.

In some examples, the eVSO engine 116 may communicate a notification message to the remote terminal 134, or multiple remote terminals. For example, the eVSO engine 116 may detect that a block storage volume is over provisioned or under provisioned based on a change in demand. The provisioning instruction(s) provided by the provisioning controller 128 and/or the flagged volume types provided by the transition simulator 124 may be communicated included in the notification message.

The system 100 may be implemented in many ways. The system may include at least the eVSO engine 116. Alternatively the system may include the cloud computing platform 102, the remote terminal 134, and/or subcomponents therein.

Figure 2:
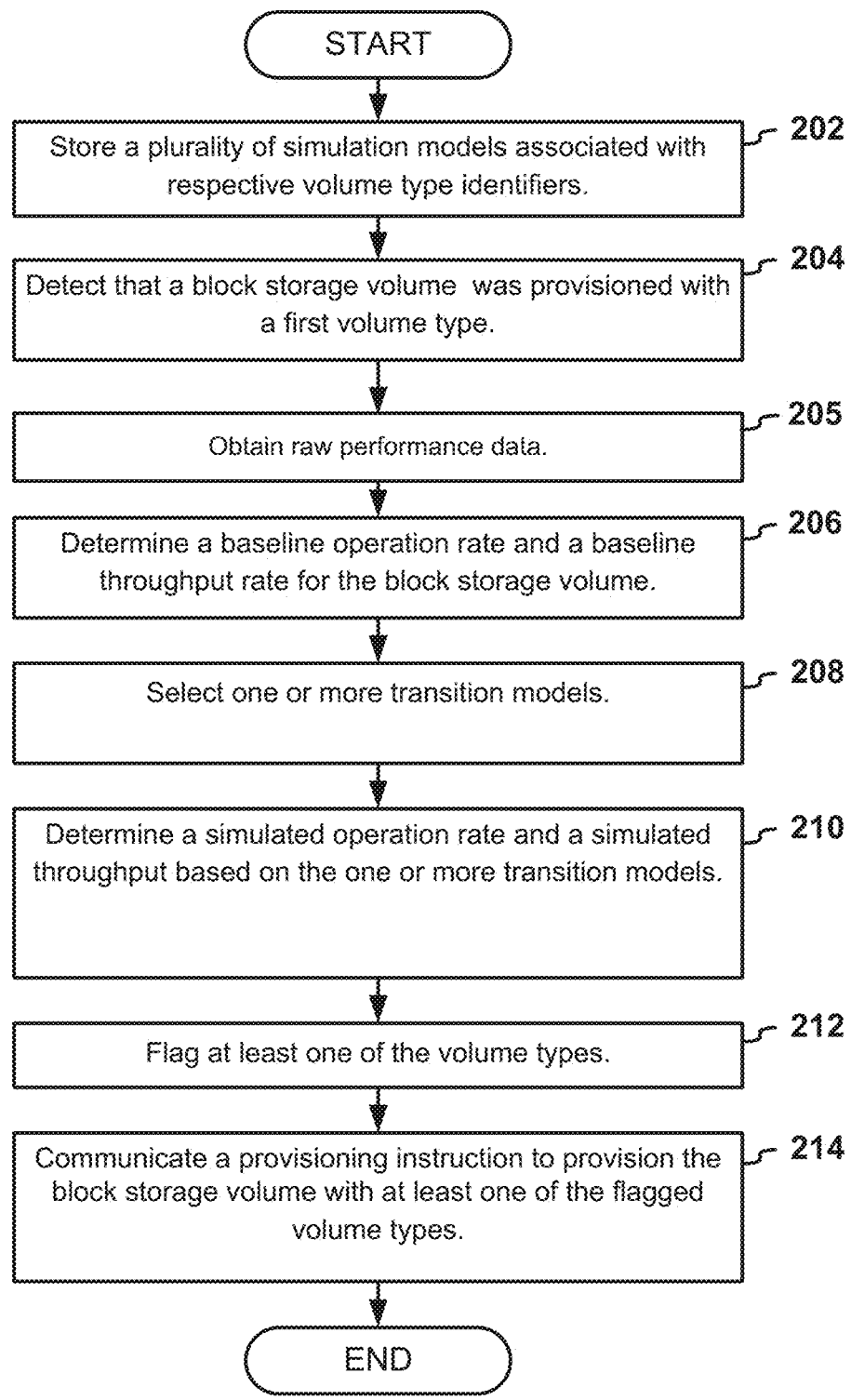
FIG. 2 illustrates a flow diagram of a first example of logic for an elastic volume type selection and optimization engine.

FIG. 2 illustrates a flow diagram of a first example of logic for the eVSO engine 116. The model repository 132 may store the transition models 126 associated with respective volume type identifiers (202). The cloud computing platform 102 may throttle a runtime performance rate permitted for accessing the block storage volumes based on the respective volume types associated with the block storage volumes.

The data acquisition controller 118 may detect that the block storage volume 104 was provisioned with a first volume type (204). The first volume type may be included in the respective volume types. The first volume type may cause the cloud computing platform 102 to throttle a runtime operation rate for accessing the block storage volume 104. For example, the first volume type may be associated with an allocation model. The cloud computing platform 102 may restrict and/or increase a runtime IO rate, such as IOPS, based on the allocation model.

The data acquisition controller 118 may obtain raw performance data (205). The raw performance data may include a plurality of performance measurements. Alternatively or in addition, the performance measurements may be derived or calculated based on the raw performance data. The raw performance data and/or the performance measurements may include throughput measurements, IO rate measurements, networking utilization measurements, storage utilization measurements, CPU utilization measurements, and/or any other information indicative of computing or networking performance related to accessing the one or more provisioned block storage volumes.

The pre-processing engine 120 may determine a baseline operation rate and/or a baseline throughput rate for the block storage volume 104 (206). For example, the pre-processing engine 120 may determine the baseline operation rate and/or the baseline throughput rate for the block storage volume 104 based on the normalization model associated with the first volume type, raw data received by the data acquisition controller 118, and/or measurements derived from the raw data. The normalization model may be stored, for example, in the model repository 132. The pre-processing engine 120 may execute and/or apply the normalization model to determine the baseline operation rate and/or the baseline throughput rate for the block storage volume 104.

In some examples, the pre-processing engine 120 may generate a percentile-based operation rate. The pre-processing engine 120 may normalize the percentile-based operation rate based a burst balance mode associated with the first volume type identifier. The burst balance mode may be indicative of a permission to increase the runtime operation rate higher than the baseline operation rate. The pre-processing engine 120 may account for the burst mode and increase the operate rate based on a burst operation rate to generate a normalized operation rate. In some examples, the pre-processing engine 120 may convert the normalized operation rate to a normalized throughput rate.

The transition simulator 124 may select one or more transition models (208). For example, a transition model may be configured to determine whether the block storage volume 104 should be transitioned to a second target volume type. In some examples, the transition simulator 124 will select multiple transition models. For example, the block storage volume 104 may be associated with the first volume type identifier. The transition simulator 124 may select transition models with target volume type identifiers do not include the first volume type identifier. Alternatively or in addition, the transition simulator 124 may receive a selection input indicative of the selected transition models.

The transition simulator 124 may determine a simulated IO rate and a simulated throughput based on one or more transition models (210). For example, the transition simulator 124 may execute a selected transition model to determine simulated IO rate(s) and/or simulated throughput rate(s) for the block storage volume 104 re-provisioned with the second volume type. In some examples, the transition simulator 124 may execute or apply multiple transition models that were previously selected. Each of the transition models may provide a set of simulated metrics that may be compared to corresponding baseline metrics.

The transition simulator 124 may flag at least one of the volume types 106 (212). For example, the transition simulator 124 may flag at least one of the volume types 106 in response to determination that a simulated performance metric is greater than a baseline performance metric. In some examples, the transition simulator 124 may flag at least one of the volume types 106 in response to determination that the corresponding simulated throughput for the at least one of the volume types 106 is greater than the baseline throughput metric. Alternatively or in addition, the transition simulator 124 may flag at least one of the volume types 106 in response to determination that the corresponding simulated operation rate for the at least one of the volume types 106 is greater than the baseline operation rate metric.

Figure 3:
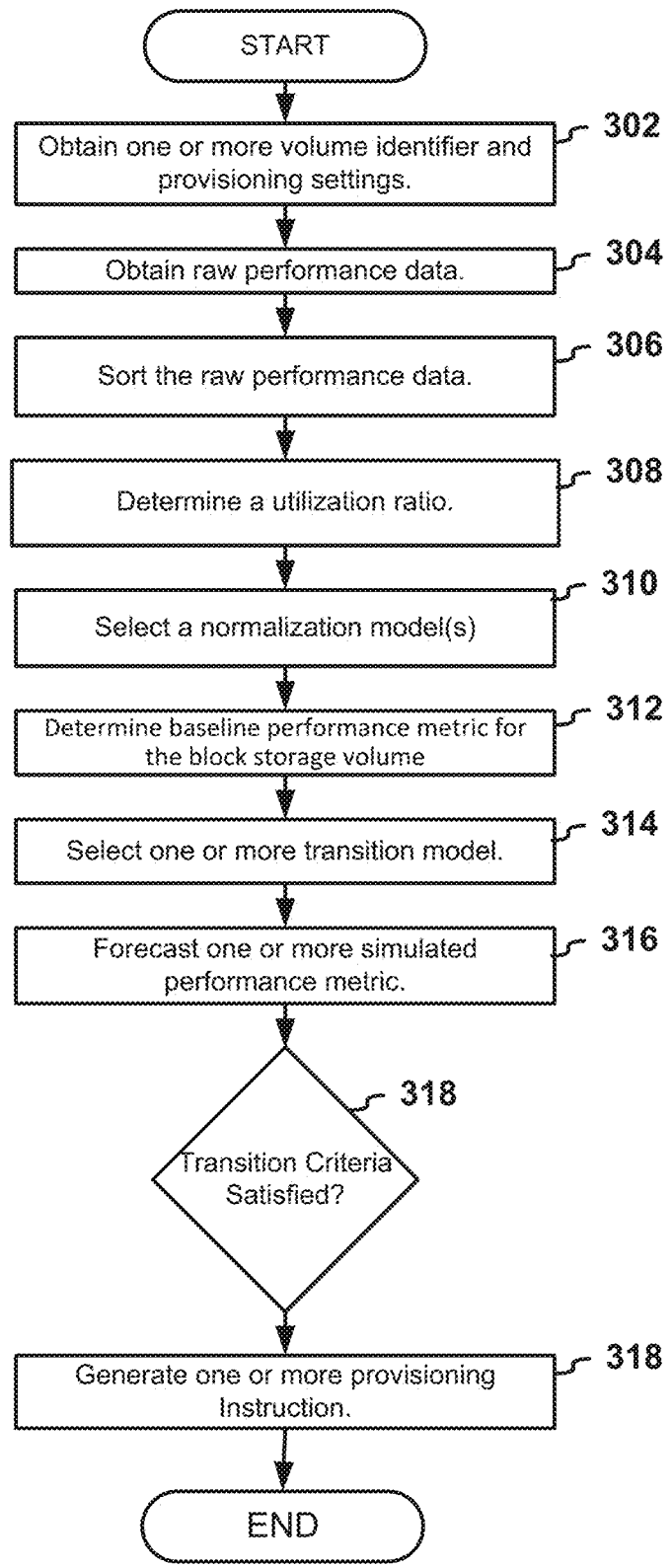
FIG. 3 illustrates a flow diagram of a second example of logic for an elastic volume type selection and optimization engine.

The provisioning controller 128 may communicate a provisioning instruction to provision the block storage volume 104 with at least one of the flagged volume types 106 (214). For example, the provisioning controller 128 may generate respective provisioning instructions for each of the flagged volume type. As discussed in reference to FIG. 1, the respective provisioning instructions may comprise an instruction to provision a new block storage volume with a volume type identifier indicative of a corresponding flagged volume type. In some examples, the provisioning controller 128 may instruct the cloud computing platform 102 to copy the contents of the block storage volume 104 to the new block storage volume. In other examples, the cloud computing platform 102 may re-provision the block storage volume 104 with the flagged volume type without creating a new block storage volume FIG. 3 illustrates a flow diagram of a second example of logic for the eVSO engine 116. The data acquisition controller 118 may obtain one or more volume identifier and/or provisioning settings (302). The volume identifier may correspond to the block storage volume 104 provisioned on the cloud computing platform 102. In some examples, the volume identifier may be provided to the data acquisition controller 118 directly. Alternatively or in addition, the volume identifier may be determined based on an account identifier or some other identifier that groups volume identifiers on the cloud computing platform 102. The provisioning settings may include the parameters applied provision block storage volume(s) on the cloud computing platform 102. For example, the provisioning settings may include, among other settings, a corresponding volume type identifier.

The data acquisition controller 118 may obtain raw performance data (304). In some examples, the data acquisition controller 118 may communicate with the cloud computing platform 102 to receive raw performance information. Alternatively or in addition, the data acquisition controller 118 may access a file or a database that stores the raw information.

The data acquisition controller 118 may sort the raw performance data (306). For example, the raw performance information may correspond to one or more block storage volume. The raw performance data may be sorted based on volume identifier, account identifier, and/or other information that identifies or groups block storage volume(s).

The pre-processing engine 120 may determine a utilization ratio (308). As previously discussed, the utilization ratio may include a ratio of a high-load performance metric to a percentile-based performance metric. The pre-processing in engine may calculate the utilization ratio based on the high-load metric and the percentile-based operation metric.

The pre-processing engine 120 may select one or more normalization models (310). For example, the model repository 132 may store the normalization models 122. Each of the normalization models 122 may be associated with a respective volume type identifier. The pre-processing engine 120 may select a subset of the normalization models 122 that are associated with volume type identifiers for particular block storage volumes provisioned on the cloud computing platform 102.

The pre-processing engine 120 may determine a baseline performance metric for the block storage volume 104 (312). For example, the pre-processing engine 120 may execute each of the selected normalization model(s) to determine baseline performance metric(s).

The transition simulator 124 may select one or more transition model (314). For example, each transition model may include a corresponding selection criteria. The transition simulator 124 may provide a provisioned volume type identifier corresponding to the block storage volume 104 to the corresponding selection criteria. The corresponding selection criteria may be executed and/or analyzed to determine whether to select a particular transition model.

The transition simulator 124 may one or more simulated performance metrics. For example, the transition simulator 124 may execute the selected transition model(s) and generate results for each transition model. Each result may include one or more simulated performance metric. As previously discussed, the simulated performance metrics may include, among other types of metrics, a simulated throughput metric and/or a simulated IO rate metric.

The transition simulator 124 may determine whether the transition criteria was satisfied (318). In response to the transition criteria being satisfied, the provisioning controller 128 may generate one or more provisioning instruction (318). The provisioning instruction may be generated as discussed in reference to FIGS. 1 and 2.

Figure 4:
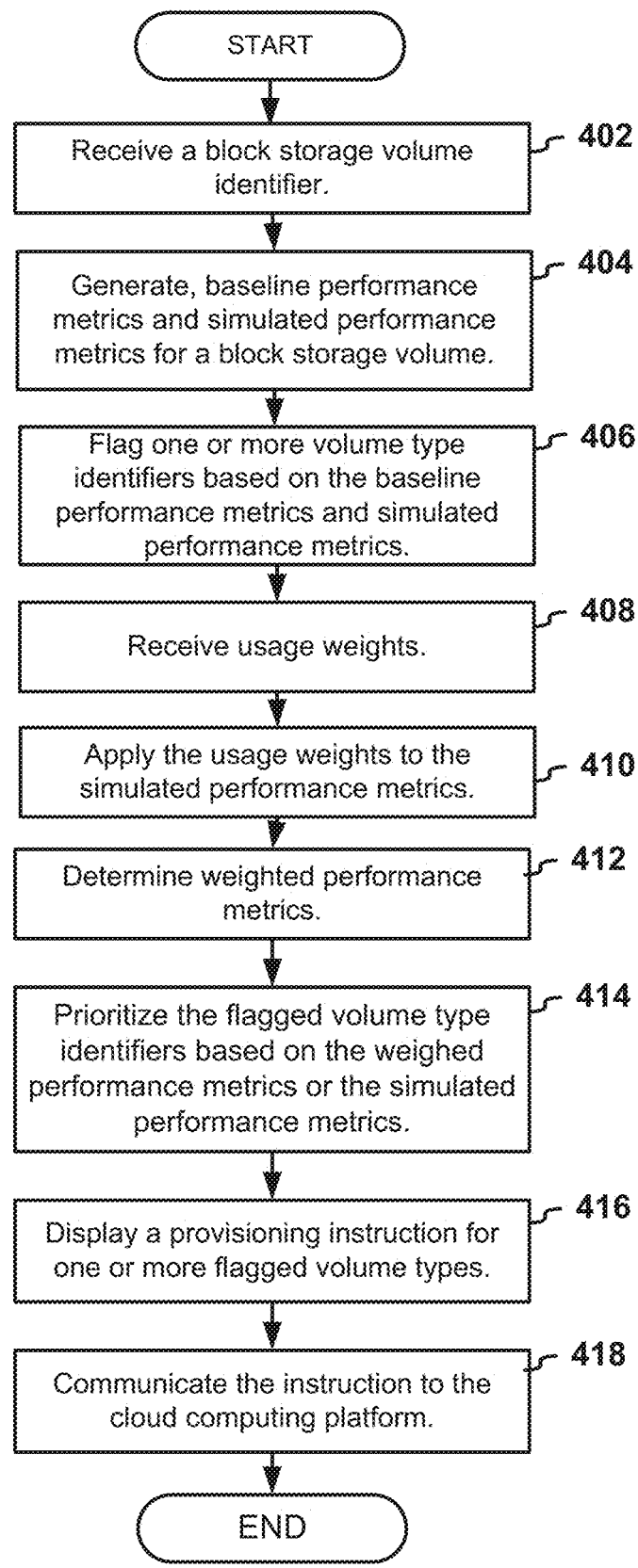
FIG. 4 illustrates a flow diagram of a third example of logic for an elastic volume type selection and optimization engine.

FIG. 4 illustrates a flow diagram of a third example of logic for the eVSO engine 116. The data acquisition controller 118 may receive a block storage volume identifier (402). In some examples, the data acquisition controller may determine one or more provisioned block storage volumes that are ready for transition analysis. For example, the data acquisition controller 118 may identify one or more block storage volumes has 90 days or more of raw performance data, billing data, updated cost. Thresholds other than the 90 days may be applicable, depending on the implementation. For example, the data acquisition controller 116 may accommodate a tolerance limit of 10% 'missing values' (in days for example) to allow the block storage volume. By way of example, if a block storage volume has 83 days of utilization/billing data (7 days of 'non-continuous' missing data), it may be considered for analyses as it falls within the tolerance limit. Any block storage volume whose recommendation is rejected would may considered again during the next analysis run.

The pre-processing engine 120 and the transition simulator 124 may generate baseline performance metrics and/or simulated performance metrics for the block storage volume 104 (404). For example, the pre-processing engine 120 may generate the baseline performance metrics based on a normalization model as discussed in FIGS. 1-3. Alternatively or in addition, the transition simulator 124 may generate simulated performance metrics as discussed in FIGS. 1-3.

The transition simulator 124 may flag one or more volume type identifiers based on the baseline performance metrics and simulated performance metrics (406). For example, the transition simulation engine may compare the baseline performance metrics and simulated performance metrics and flag one or more volume type as discussed in FIGS. 1-3.

In some examples, the transition simulator 124 may flag multiple volume types. For example, the transition simulator 124 may determine that one or more volume types would be better suited for the block storage volume 104 than the volume type provisioned for the block storage volume 104. To reduce the number of results and select the optimal block storage volume type, the transition simulator 124 may implement a weighting scheme.

The transition simulator 124 may receive usage weights (408). In some examples, the usage weights may include performance-based weights and/or cost-based metrics. Alternatively or in addition, the usage weights may include a cost, an importance multiplier, and/or other weight that is indicative of cost and/or performance. The usage weights may be received from a billing system, a data file, the cloud computing platform 102, and/or some other source.

The transition simulator 124 may apply the usage weights to the simulated performance metrics (410). For example, the weights may be a multiplier for throughput rates, IO rates, and/or an amount of information transferred at calculated throughput rate or IO rate. The transition simulation engine may determine weighted performance metrics (412). The weighted performance metrics may be based on a combination of the usage weights and the simulated performance metrics.

The provisioning controller 128 may prioritize the flagged volume type identifiers based on the weighed performance metrics and/or the simulated performance metrics (414). For example, the provisioning controller 128 may sort the flagged volume types based on the greatest increase in performance achieved by transitioning to a particular flagged volume type. Alternatively or in addition, the provisioning controller 128 may sort the flagged volume types based on the greatest decrease in cost achieved by transitioned to a particular flagged volume type.

The provisioning controller 128 may display a provisioning instruction for one or more flagged volume type (416). For example, the provisioning controller 128 may communicate the provisioning instruction(s) for one or more volume types via a user interface. The user interface may display one or more provisioning instruction generated by the provisioning controller. Alternatively or in addition, the user interface may display one or more flagged volume types. In some examples, the user interface may also display the baseline performance metric(s), the runtime-performance metric(s), the simulated performance metric(s), and/or the weighted performance metric(s) that were generated based on a normalization model and a transition model for a particular block storage volume.

In some examples, the user interface may group the provisioning instruction(s), recommended target volume type identifier(s) and/or metric(s) by block storage volume identifiers. The user interface may accept input indicative of acceptance or denial of a provisioning instruction and/or a flagged volume type identifier.

In some examples, the user interface display a prioritization of the flagged volume types and/or the provisioning instructions. For example, the user interface may display the performance increase and/or the cost saving achieved by transitioning to one or more of the flagged volume types. For example, the user interface may display percentile bins of performance increases, cost savings, or some other performance driver.

The provisioning controller 128 may communicate the provisioning instruction to the cloud computing platform 102 (418). For example, the provisioning controller 128 may receive an input indicative of an acceptance of the provisioning instruction as previously discussed. In response to acceptance of the provisioning instruction, the provisioning controller 128 may communicate the provisioning instruction to the cloud computing platform 102. The cloud computing platform 102 may provision or re-provision the block storage volume 104 in response to receiving the provisioning instruction. Alternatively or in addition, the cloud computing platform may provision a new block storage volume in response to receipt of the provisioning instruction. In other examples, the provisioning controller 128 may communicate the provisioning instruction to the cloud computing platform 102 automatically without receipting acceptance via the user interface. For example, the provisioning controller 128 may select the provisioning instruction associated with the highest priority flagged volume type.

The steps illustrated in FIG. 2, FIG. 3 and FIG. 4 may include additional, different, or fewer operations than illustrated. Alternatively or in addition, the steps may be executed in a different order than illustrated in FIG. 2, FIG. 3 and FIG. 4. In some examples, the steps illustrated in FIG. 2, FIG. 3 and FIG. 4 may be interchanged or replaced with other steps. The system 100 may be implemented with additional, different, or fewer components than illustrated. Each component may include additional, different, or fewer components.

Figure 5:
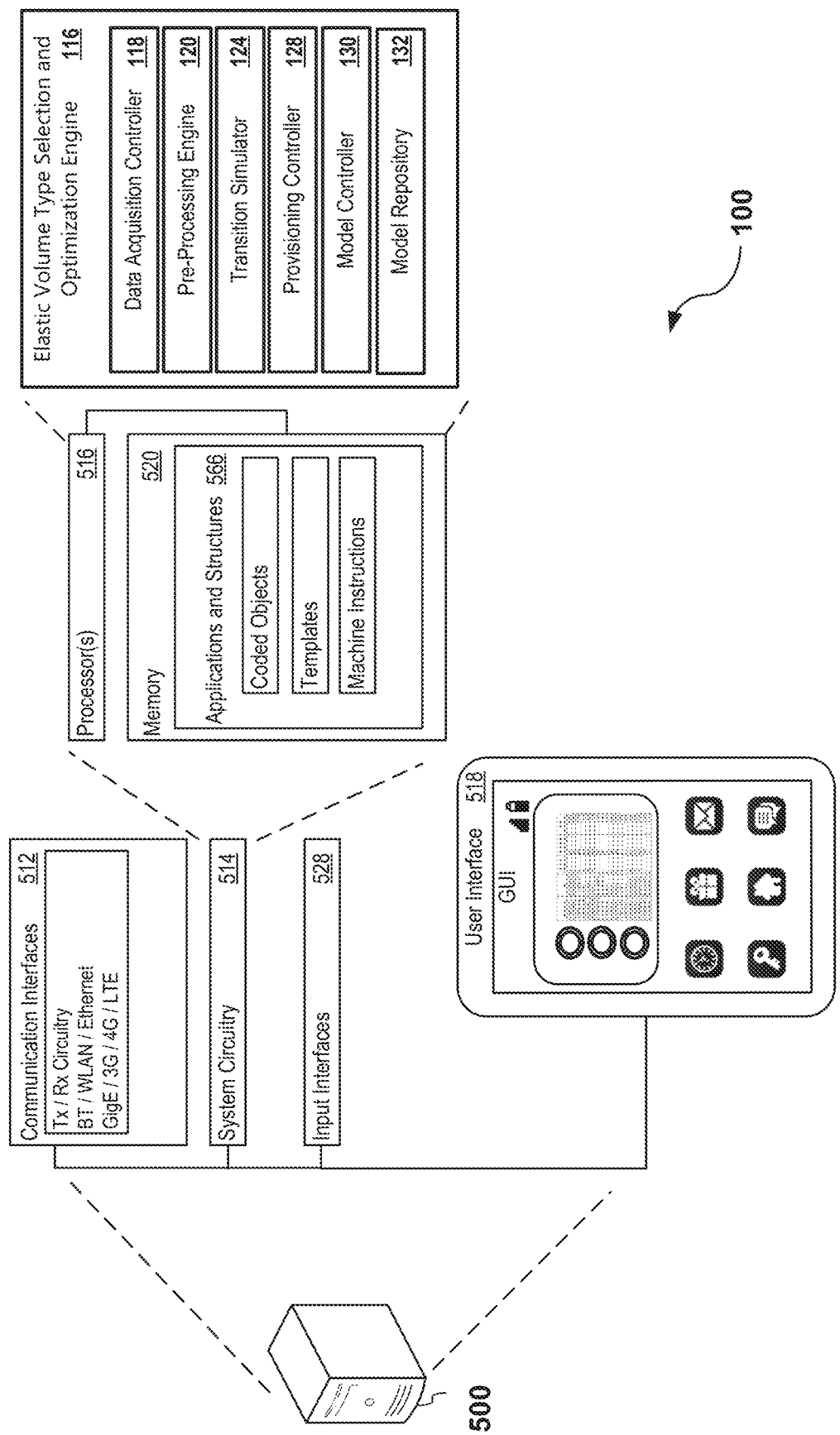
FIG. 5 illustrates an example of a computer environment.

FIG. 5 illustrates an example of a computer environment 500 for the system 100. The computer environment 500 may include a hardware platform for the data acquisition controller 118, the pre-processing engine 120, the transition simulator 124, the provisioning controller 128, the model controller 130, the model repository 132, and/or the eVSO engine 116. The computer environment 500 may include communication interfaces 512, input interfaces 528 and/or system circuitry 514. The system circuitry 514 may include a processor 516 or multiple processors. Alternatively or in addition, the system circuitry 514 may include memory 520.

The processor 516 may be in communication with the memory 520. In some examples, the processor 516 may also be in communication with additional elements, such as the communication interfaces 512, the input interfaces 528, and/or the user interface. Examples of the processor 516 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 516 may be one or more devices operable to execute logic. The logic may include computer executable instructions or computer code stored in the memory 520 or in other memory that when executed by the processor 502, cause the processor 516 to perform the features implemented by the logic of the data acquisition controller 118, the pre-processing engine 120, the transition simulator 124, the provisioning controller 128, the model controller 130, the model repository 132, and/or the eVSO engine 116. The computer code may include instructions executable with the processor 516.

The memory 520 may be any device for storing and retrieving data or any combination thereof. The memory 520 may include non-volatile and/or volatile memory, such as a random access memory (RAM), a read-only memory (ROM), an erasable programmable read-only memory (EPROM), or flash memory. Alternatively or in addition, the memory 520 may include an optical, magnetic (hard-drive), solid-state drive or any other form of data storage device. The memory 520 may include at least one of the data acquisition controller 118, the pre-processing engine 120, the transition simulator 124, the provisioning controller 128, the model controller 130, the model repository 132, and/or the eVSO engine 116. In addition, the memory may include any other component or sub-component of the system 100 described herein.

The user interface 518 may include any interface for displaying graphical information. The system circuitry 514 and/or the communications interface(s) 512 may communicate signals or commands to the user interface 518 that cause the user interface to display graphical information. Alternatively or in addition, the user interface 518 may be remote to the system 100 and the system circuitry 514 and/or communication interface(s) may communicate instructions, such as HTML, to the user interface to cause the user interface to display, compile, and/or render information content. In some examples, the content displayed by the user interface 518 may be interactive or responsive to user input. For example, the user interface 518 may communicate signals, messages, and/or information back to the communications interface 512 or system circuitry 514.

The system 100 may be implemented in many different ways. In some examples, the system 100 may be implemented with one or more logical components. For example, the logical components of the system may be hardware or a combination of hardware and software. The logical components may include the data acquisition controller 118, the pre-processing engine 120, the transition simulator 124, the provisioning controller 128, the model controller 130, the model repository 132, and/or the eVSO engine 116 and/or other components and subcomponents of the system 100 described herein. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 520, for example, that comprises instructions executable with the processor 516 or other processor to implement one or more of the features of the logical components. When any one of the logical components includes the portion of the memory that comprises instructions executable with the processor 516, the component may or may not include the processor 516. In some examples, each logical component may just be the portion of the memory 520 or other physical memory that comprises instructions executable with the processor 502 or other processor to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

Figure 6:
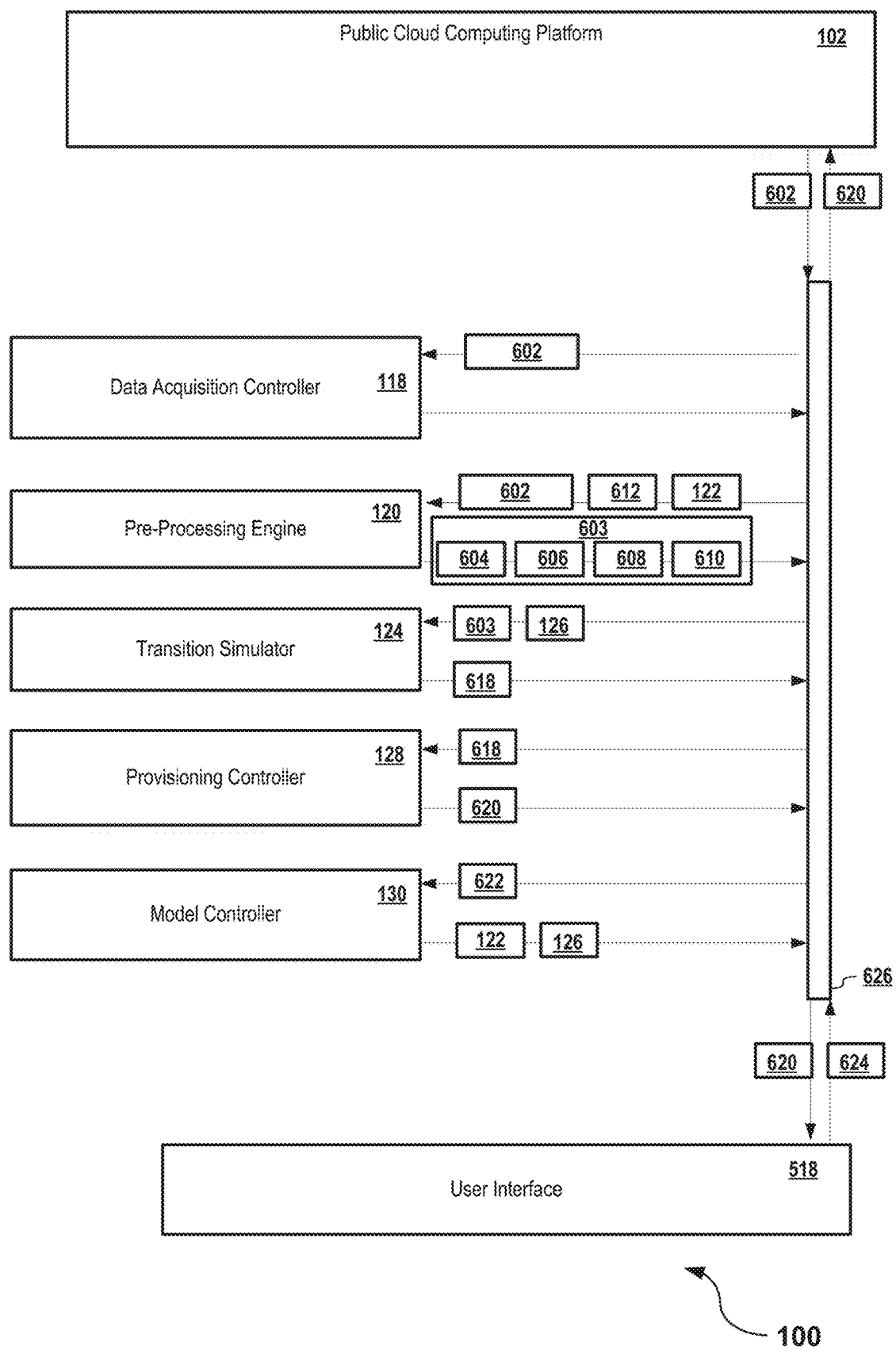
FIG. 6 illustrates a second example of a system.

FIG. 6 illustrates a second example of the system 100. The data acquisition controller 118 may monitor the public cloud computing platform 102 to receive the raw performance data 602. Alternatively or in addition, the data acquisition controller 118 may receive the raw performance data 602 from a file, a database, or some other source. The data acquisition controller 118 may store the raw performance data 602 in a storage system, such as a database or a data lake. Alternatively or in addition, the data acquisition controller 118 may communicate the raw performance data to the pre-processing engine 120.

The pre-processing engine 120 may pre-process the raw performance data 602 to determine key metrics 603. For example, the pre-processing engine 120 may perform statistical and/or machine learning analysis on the raw performance data. In some examples, the key metrics may include a high-load metric 604 and a percentile-based performance metric 606, a utilization ratio 608, and/or a normalized baseline performance metric 610. Refer to FIG. 1 for examples of the high-load metrics, percentile based metrics, and/or other key performance metrics. In some examples, the pre-processing engine 120 may receive baseline metrics 612 corresponding to one or more volume types and a normalization model 122. The processing engine 120 may execute or access the normalization model to determine the normalized baseline metrics 610.

The transition simulator 124 may forecast whether one or more volume types will result in a more optimal utilization of computer resources on the public cloud computing platform 102. Alternatively or in addition, the transition simulator 124 may forecast that one or more volume may provide higher performance on the public cloud computing platform 102. For example, the transition simulator 124 may determine that the block storage volume 104 provisioned with a first volume type may receive less restrictions on performance if the block storage volume 104 were re-provisioned one or more second volume types. The transition simulator may receive the key performance metrics 603 and a transition model 126, or multiple transition models. The transition simulator 124 may determine one or more flagged volumes types 618 based the key performance metrics 603 and the transition model 126, as described in FIG. 1-4.

The provisioning controller 128 may generate a provisioning instruction 620 or multiple provisioning instructions. The provisioning instruction 620 may include an instruction to re-provision the block storage volume 104 with at least one of the volume types 106. For example, the transition simulator 124 may receive the flagged volume type 618. The provisioning controller 128 may generate the provisioning instruction 620 for a particular volume with the flagged volume type. The provisioning instruction may include provisioning settings. In some examples, the provisioning instruction may be communicated to the public cloud computing platform 102 to re-provision one or more block storage volumes.

The model controller 130 may manage the normalization models 122 and/or the transition models 126. For example, the numerical thresholds and logic used to define the normalization models 122 and/or the transition models 126 may change over time as the allocation models for each of the volume types 106 are adjusted by the public cloud computing platform 102. The model controller 130 may receive model update parameters 622. The model controller 130 may update, replace, add, or delete normalization models 122 and/or transition models 126. Alternatively or in addition, the model controller 130 may receive an updated transition model and/or an updated normalization model. In an example, the parameters defined in Table 1 and Table 2 may change over time as the public cloud computing platform changes the EBS scheme.

In some examples, the user interface 518 may receive the provisioning instruction 620. Alternatively or in addition, the provisioning instruction 620, the key metrics 603, and/or other relevant information may be communicated to the user interface 518. The user interface may receive inputs, as described in reference to FIG. 1, and FIGS. 7-9, and communicate input information 624 to the data acquisition controller, the pre-processing engine, the transition simulator, the provisioning controller, the model controller, and/or the public cloud comping platform 102.

The system may include or access a communications infrastructure 626. The communications infrastructure may include bus circuitry, networking equipment, message broker(s), database(s), and/or any other infrastructure, service, or circuitry where information is stored, cached, and/or exchanged to facilitate communications.

Figure 7:
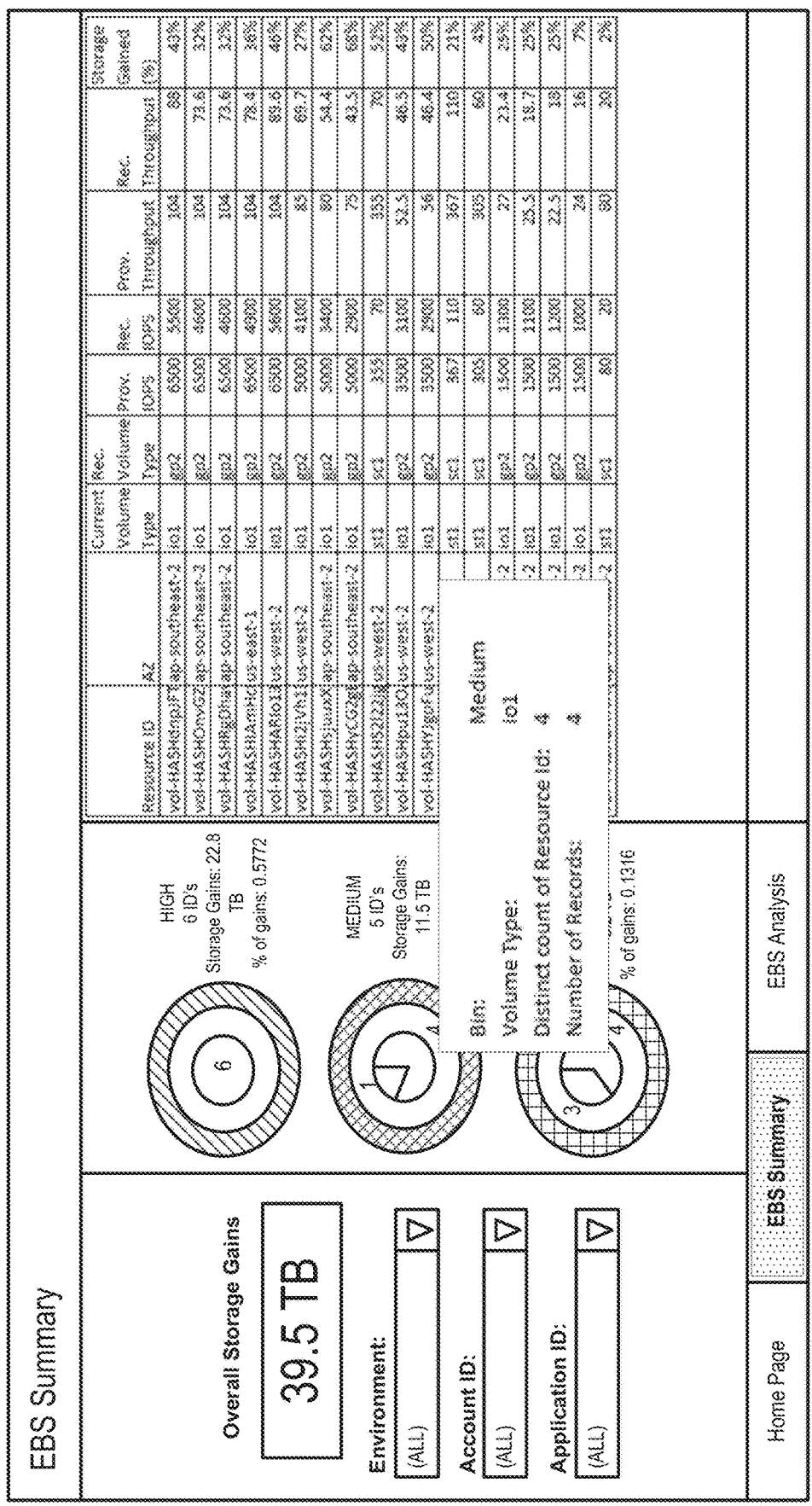
FIG. 7 illustrates a first example of a graphical user interface.

FIG. 7 illustrates a first example of a graphical user interface 702 for the eVSO engine 116. The graphical user interface 702 may display the performance savings and/or the cost saving achieved by transitioning a block storage volume from a first volume type to a second volume type. For example, the percentile bins may indicate of performance increases, cost savings, or some other performance driver(s). Alternatively or in addition, each of the bins may differentiate between the current volume types or recommended volume types for a transition.

The graphical user interface 702 may display a recommendation table for one or more resource identifier. For example, the graphical user interface 702 may display the current volume type, the recommended volume type, performance savings, and/or the potential cost savings for transitioning to the recommended volume type. For example, the recommendation table may one or more of recommendations rows. For each recommendation row, the recommendation table may include a resource identifier, a region identifier, a current provisioned type identifier, a recommended volume type identifier, a provisioned (or baseline) performance metric, a recommended performance metric, and/or a performance change metric. The performance change metric illustrated in FIG. 7 includes "storage gained (%)". In other examples, the recommendation table may include additional or alternative performance change metrics, such as forecasted throughput change, forecasted IOPS change, and/or any other forecasted performance metric that may result from changing to the recommended volume type.

In some examples, the eVSO engine 116 may receive an operation input corresponding to at least one of the recommendation rows. In response to receipt of the operation input, the eVSO engine 116 may generate a provisioning instruction configured to provision one or more block storage volumes on a particular cloud computing platform. The operation input may include a signal or message that indicates interaction related to one or more recommendation rows.

Figure 8:
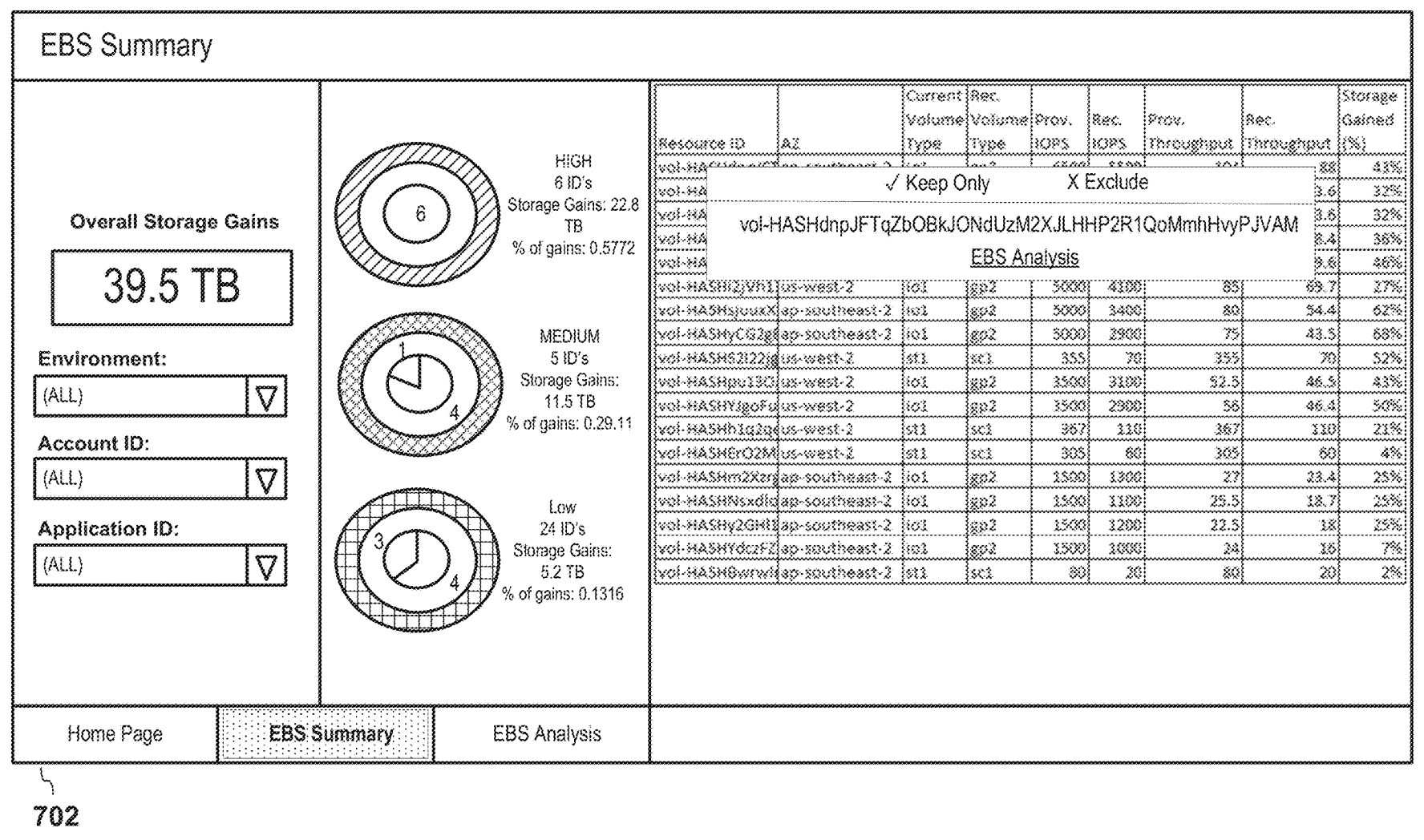

FIG. 8 illustrates a second example of the graphical user interface 702. As illustrated in FIG. 8, a user may select which recommendation to accept and which to reject from the recommendation list. In some examples, the graphical user interface 702 may include a master approve indicator that allows user to perform one or multiple approvals in a simplified way. Alternatively or in addition, the approve indicator may cause one or more instructions to be sent to the public cloud computing platform 102 to perform the transition associated with one or more resource identifiers.

The graphical user interface 702 may allow the percentile bins and/or recommendation list to be updated, expanded, and/or filtered, based on identifiers of an environment, account, application, and/or other grouping criteria. Alternatively or in addition, a user may view the IOPS/Throughput utilization pattern for every individual volume with dynamic date filters. In some examples, the graphical user interface 702 may enable the user may select an analysis option to gain further details of a particular block storage volume.

FIG. 9 Illustrates a third example of the graphical user interface 702. The graphical user interface may include a detailed analysis view. The detailed analysis view may include interactive visual representations, such as graphics, numbers, and/or any other visual indicators of any of the derived, calculated, and/or monitored performance metrics described herein, including, for example, the baseline performance metrics, the runtime performance metrics, the percentile base performance metrics, and the maximum performance metrics.

In the examples illustrated in FIGS. 7-9, the volume types refer to AMAZON EBS volumes types, such as io1, gp2, sc1, st1. In other examples, the volume types may include additional or alternative volume types, as described herein.

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU") or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, ..., and <N>" or "at least one of <A>, <B>, <N>, or combinations thereof" or "<A>, <B>, ..., and/or <N>" are defined by the Applicant in the broadest sense, superseding any other implied definitions hereinbefore or hereinafter unless expressly asserted by the Applicant to the contrary, to mean one or more elements selected from the group comprising A, B, ..., and N. In other words, the phrases mean any combination of one or more of the elements A, B, . . . , or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method, the method comprising:
    storing, in a repository, a plurality of transition models that each include a rule that governs dynamic resource allocation on a cloud computing platform for providing access to block storage volumes, the rule within each transition model is associated with respective volume type identifiers of volume types;
    detecting that a block storage volume was provisioned by a cloud computing platform based on a first volume type identifier of a first volume type, wherein the first volume type causes the cloud computing platform to control a runtime operation rate permitted for accessing at least one of the block storage volumes, the runtime operation rate characterizing a rate at which distinct memory operations are performed;
    determining a baseline operation rate and a baseline throughput rate for the provisioned block storage volume using a normalization model to support comparison with a second volume type, the baseline throughput rate characterizing a data volume transmission over time regardless of a number of distinct memory operations;
    obtaining historical performance measurements for the provisioned block storage volume;
    selecting from the plurality of transition models a transition model that is associated with a second volume type identifier of the second volume type, wherein the second volume type causes the cloud computing platform to control a runtime throughput rate permitted for accessing the at least one of the block storage volumes;
    determining, based on the selected transition model and the historical performance measurements for the provisioned block storage volume, a simulated operation rate and a simulated throughput rate; and
    communicating, in response to at least one of the simulated throughput rate being greater than the baseline throughput rate or the simulated operation rate being greater than the determined baseline operation rate, a provisioning instruction to re-provision the provisioned block storage volume on the cloud computing platform, the provision instruction comprising provisioning settings, the provisioning settings comprising the second volume type identifier.

2. The method of claim 1, wherein the provisioning settings further comprise at least one of a volume name, a volume size, a throughput rate, or an operation rate.

3. The method of claim 1, wherein determining the baseline operation rate and the baseline throughput rate for the provisioned block storage volume further comprises:
    generating a percentile-based operation rate based on a plurality of operation rate measurements derived from the historical performance measurements;
    normalizing the percentile-based operation rate based a burst balance mode associated with the first volume type identifier, the burst balance mode indicative of a permission to increase the runtime operation rate higher than the baseline operation rate; and
    converting the normalized percentile-based operation rate to a normalized throughput rate, wherein the baseline throughput rate comprises the normalized throughput rate.

4. The method of claim 1, further comprising:
    selecting a plurality of transition models that are respectively associated with the volume types, each of the transition models configured to determine a respective simulated operation rate and a respective simulated throughput rate for a corresponding volume type;
    flagging at least one of the volume types in response to the respective simulated throughput rate for the at least one of the volume types being greater than the baseline throughput rate or the respective simulated operation rate for the at least one of the volume types being greater than the baseline operation rate; and
    generating respective provisioning instructions for each of the flagged volume types, wherein each of the respective provisioning instructions comprise an instruction to provision a new block storage volume with a volume type identifier indicative of a corresponding flagged volume type.

5. The method of claim 1, wherein communicating the provisioning instruction further comprises:
    transmitting the provisioning instruction to a cloud computing platform, wherein the cloud computing platform is configured to provision a new block storage volume based on the provisioning settings of the provisioning instruction.

6. The method of claim 5, wherein before transmitting the provisioning instruction to the cloud computing platform, the method further comprises:
    transmitting a plurality of provisioning instruction candidates to a remote terminal; and
    receiving a selection input indicative of at least one of the provisioning instruction candidates.

7. The method of claim 1, wherein determining, based on the transition model and the historical performance measurements, a simulated operation rate and a simulated throughput further comprises:
    determining, based on the historical performance measurements, a high-load operation rate and a percentile-based operation rate over an operational time range;
    increasing the high-load operation based on a buffer value;
    generating a utilization ratio of the high-load operation rate and the percentile -based operation rate; and
    determining the simulated operation rate based on the utilization ratio.

8. The method of claim 7, further comprising:
    receiving an update parameter for at least one of the transition models, the update parameter comprising an update buffer value; and
    updating the transition model with the updated buffer value.

9. The method of claim 1, further comprising
    displaying a graphical user interface comprising a recommendation table, the recommendation table comprising a recommendation row corresponding to the block storage volume, the recommendation row comprising the first volume type identifier, the second volume type identifier, a base line performance metric, a simulated performance metric and a performance change metric;
    receiving an operation input corresponding to the recommendation row; and generating the provisioning instruction in response to receipt of the operation input.

10. A system comprising:

circuitry configured to store, in a repository, a plurality of transition models associated with respective volume types, where each of the plurality of transition models include a rule that governs dynamic resource allocation on a cloud computing platform for providing access to block storage volumes, the rule within each transition model is associated with respective volume type identifiers of volume types;

circuitry configured to detect that a block storage volume was provisioned with a first volume type included in the respective volume types, wherein the first volume type causes the cloud computing platform to restrict a runtime throughput rate or a runtime operation rate for accessing the provisioned block storage volume, the runtime operation rate characterizing a rate at which distinct memory operations are performed, the runtime throughput rate characterizing a data volume transmission over time regardless of a number of distinct memory operations;

circuitry configured to obtain historical performance measurements for the provisioned block storage volume;

circuitry configured to determine a baseline operation rate and a baseline throughput rate for the provisioned block storage volume via a normalization model to support comparison between the provisioned volume type and at least one other one of the volume types;

circuitry configured to select a plurality of transition models that are associated with at least one of the respective volume types;

circuitry configured to determine, based on historical performance measurements of the provisioned block storage volume and each of the selected transition models, a corresponding simulated operation rate and a corresponding simulated throughput rate for each of the selected transition models;

circuitry configured to flag at least one of the volume types in response to satisfaction of a condition comprising at least one of the corresponding simulated throughput rate for the at least one of the volume types being greater than the baseline throughput rate or the corresponding simulated operation rate for the at least one of the volume types being greater than the baseline operation rate; and circuitry configured to communicate at least one provisioning instruction comprise an instruction to re-provision the provisioned block storage volume with at least one of the flagged volume types.

11. The system of claim 10, wherein, further comprising:

circuitry configured to select, from the repository, the normalization model from a plurality of normalization models in response to the normalization model being associated with a first volume type identifier for the first volume type.

12. The system of claim 10, wherein circuitry configured to determine a baseline operation rate and a baseline throughput rate for the provisioned block storage volume further comprises:

circuitry configured to execute the normalization model, the normalization model comprising instructions executable to:

generate a percentile-based operation rate based on a plurality of operation rate measurements derived from the historical performance measurements, normalize the percentile-based operation rate based a burst balance mode associated with a first volume type identifier for the first volume type, the burst balance mode indicative of a permission to increase the runtime operation rate higher than the baseline operation rate, and convert the normalized percentile-based operation rate to a normalized throughput rate, wherein the baseline throughput rate comprises the normalized throughput rate.

13. The system of claim 10 wherein circuitry configured to determine, based on historical performance measurements of the provisioned block storage volume and each of the selected transition models, a corresponding simulated operation rate and a corresponding simulated throughput further comprises:

circuitry configured to execute each of the selected transition models, wherein each of the selected transition models comprise instructions executable to:

determine, based on the historical performance measurements, a high-load throughput rate and a percentile-based throughput rate over an operational time range, generate a utilization ratio of the high-load throughput rate and the percentile-based throughput rate, and determine the corresponding simulated throughput rate based on the utilization ratio.

14. The system of claim 10, wherein circuitry configured to communicate at least one provisioning instruction comprise an instruction to re-provision the provisioned block storage volume with at least one of the flagged volume types further comprises:

circuitry configured to transmit the provisioning instruction to the cloud computing platform, wherein the cloud computing platform is configured to re-provision the provisioned block storage volume based on provisioning settings of the provisioning instruction.

15. The system of claim 10, further comprising:

circuitry configured to communicate volume type identifiers corresponding to the flagged volume types to a display interface configured to display the flagged volume types;

circuitry configured to receive a selection input corresponding to a volume type identifier displayed on the display interface; and circuity configured to generate the provisioning instruction in response to receipt of the selection input, wherein provisioning settings of the provisioning instruction comprises the volume type identifier selected based on the selection input.

16. The system of claim 10, wherein the flagged volume types comprise at least one of an IO optimized volume type, an IO provisioned volume type, or a throughput optimized volume type.

17. A system comprising:

a processor and a non-transitory storage medium, the non-transitory storage medium comprising a plurality of instructions executable by a processor, the instructions comprising:

instructions executable by the processor to store, in a repository, a plurality of transition models associated with respective volume types, where each of the plurality of transition models include a rule that governs dynamic resource allocation on a cloud computing platform for providing access to block storage volumes, the rule within each transition model is associated with respective volume type identifiers of volume types;

instructions executable by the processor to detect that a block storage volume was provisioned with a first volume type included in the respective volume types, wherein the first volume type causes the cloud computing platform to restrict a runtime performance metric monitored by the cloud computing platform for throttling accessing the provisioned block storage volume;

instructions executable by the processor to obtain historical performance measurements for the provisioned block storage volume;

instructions executable by the processor to determine a baseline performance metric for the provisioned block storage volume via a normalization model to support comparison between the provisioned volume type and at least one other one of the respective volume types;

instructions executable by the processor to select a plurality of transition models that are associated with at least one of the respective volume types;

instructions executable by the processor to determine, based on historical performance measurements of the provisioned block storage volume and each of the selected transition models, a corresponding simulated performance metric for each of the selected transition models;

instructions executable by the processor to flag at least one of the volume types in response the corresponding simulated performance metric for the at least one of the volume types being greater than the baseline performance metric; and instructions executable by the processor to communicate at least one provisioning instruction comprise an instruction to re-provision the provisioned block storage volume with at least one of the flagged volume types.

18. The system of claim 17, wherein the instructions executable by the processor to select the transition models further comprise:

instructions executable by the processor to access a model database comprising pre-stored transition models, each of the pre-stored transition models associated with selection criteria configured to determine whether the transition model is compatible with the first volumes type;

instructions executable by the processor to determine, based on the selection criteria, that at least one of the pre-stored transition models is compatible with the first volume type; and instructions executable by the processor to select at least one of the pre-stored transition models in response to the at least one of the pre-stored transition models being compatible with the first volume type.

19. The system of claim 17, wherein the instructions executable by the processor to determine corresponding simulated operation rate and a corresponding simulated throughput rate for each of the selected transition models further comprise:

instructions executable by the processor to determine, based on the historical performance measurements, a high-load performance metric and a percentile-based performance metric over an operational time range;

instructions executable by the processor to generate a utilization ratio of the high-load performance metric and the percentile-based performance metric; and instructions executable by the processor to determine, based on the utilization ratio, at least one of the corresponding simulated operation rate or the corresponding simulated throughput rate.

20. The system of claim 17, wherein the non-transitory storage medium further comprises:

instructions executable by the processor to weigh the simulated performance metrics for each of the flagged volume types based on usage weights corresponding to the flagged volume types;

instructions executable by the processor to prioritize the flagged volume types based on the weighed simulated metrics; and instructions executable by the processor to select a flagged volume type associated with a highest priority.

* * * * *